(No Model.) 2 Sheets—Sheet 2.
F. R. BAUER.
MACHINE FOR SHARPENING SAWS.
No. 518,731. Patented Apr. 24, 1894.
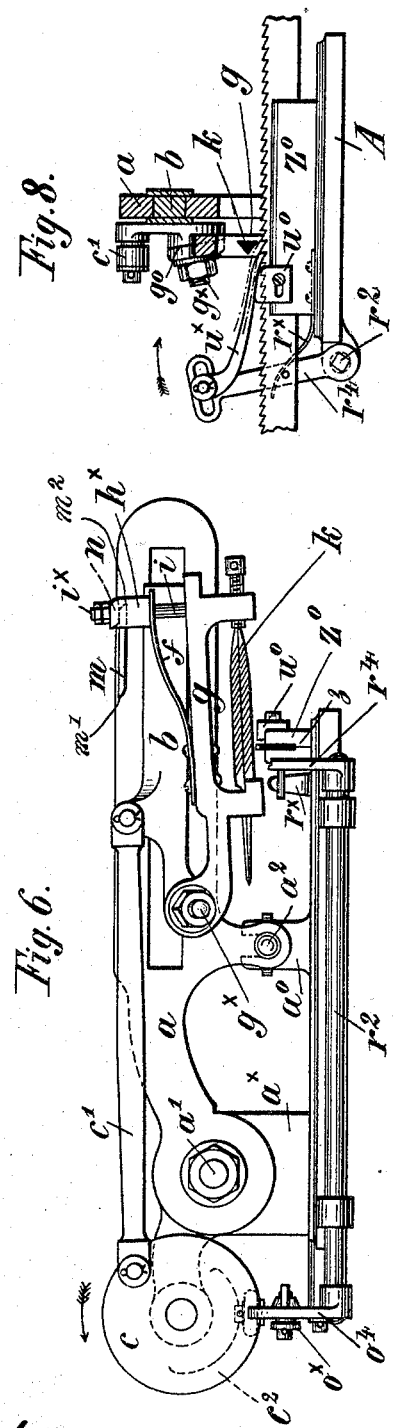
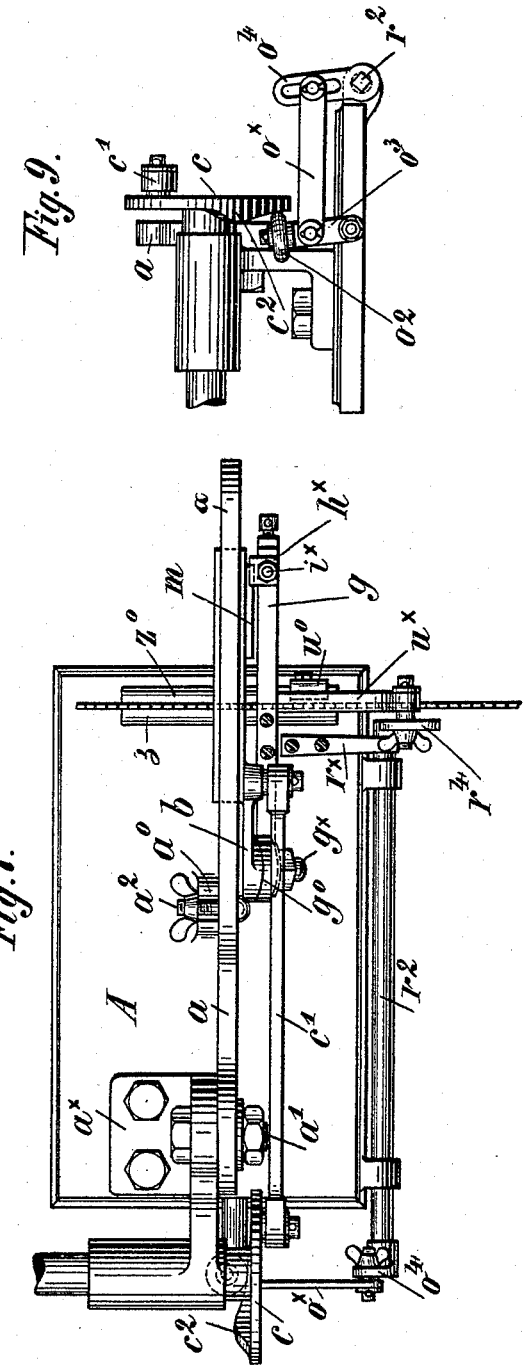
Witnesses:
H. G. Dieterich
B. W. Sommers
Inventor:
Friederich R. Bauer
By Henry Orth
Atty.

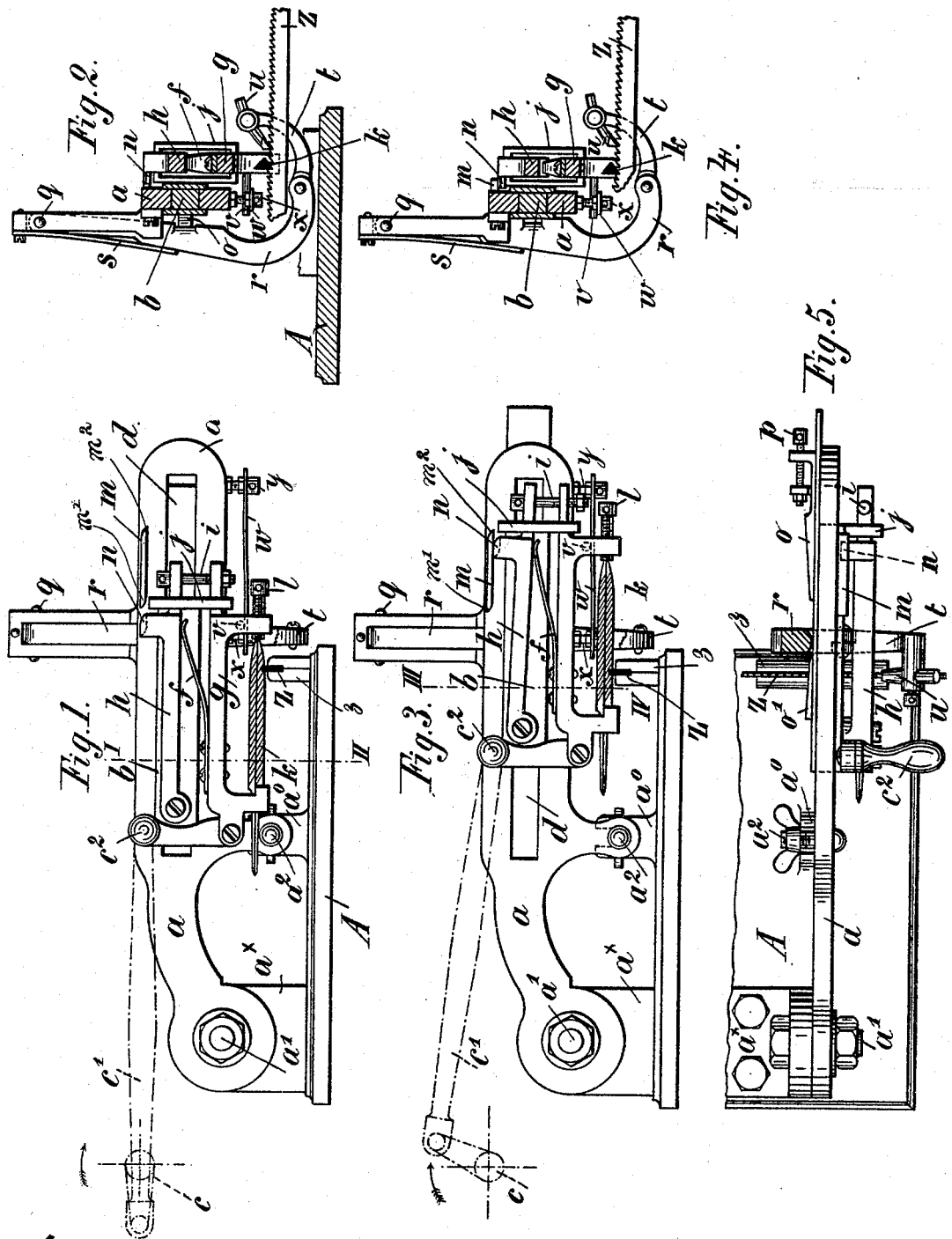

United States Patent Office.

FRIEDERICH RICHARD BAUER, OF HAMBURG, GERMANY, ASSIGNOR TO THE FIRM OF MAX FRIEDHEIM, OF SAME PLACE.

MACHINE FOR SHARPENING SAWS.

SPECIFICATION forming part of Letters Patent No. 518,731, dated April 24, 1894.

Application filed June 6, 1892. Serial No. 435,632. (No model.) Patented in Germany April 13, 1890, No. 54,532, and August 14, 1890, No. 56,383.

*To all whom it may concern:*

Be it known that I, FRIEDERICH RICHARD BAUER, a subject of the German Emperor, residing at Hamburg, in the German Empire, have invented certain new and useful Improvements in Machines for Sharpening Saws, (for which I have obtained patents in Germany, No. 54,532, dated April 13, 1890, and No. 56,383, dated August 14, 1890,) of which the following is a specification.

My invention has relation to machines for sharpening saws, and it has for its object the provision of simple mechanical means for controlling the movements and operation of the file relatively to the saw teeth, and for feeding the saw in accordance with the movements of the file, as will now be fully described, reference being had to the accompanying drawings, in which—

Figure 1 is a side elevation of a saw sharpening machine embodying my invention, the file carriage being shown in its normal position. Fig. 2 is a vertical transverse section thereof taken about on line I—II of Fig. 1. Fig. 3 is a view similar to Fig. 1 showing the file carrier in its operative position and about to reach the limit of its forward or operative motion. Fig. 4 is a vertical transverse section taken about on line III—IV of Fig. 3, and Fig. 5 is a top plan view partly in horizontal section, a portion of the bed plate being broken away. Figs. 6, 7, 8, and 9, are a side elevation, top plan view, cross section, and end elevation respectively of a machine such as shown in Figs. 1 to 5 illustrating a slight modification in the construction of the file carrier and saw feeding devices.

Similar letters refer to like parts wherever such may occur in the above figures of drawings.

Referring now to Figs. 1 to 5 inclusive, A indicates the bed plate provided with bracket $a^x$ to which is bolted by a bolt $a'$ a longitudinally slotted bar $a$ that is vertically adjustable in the slot of a bracket $a^0$ on bed plate A by means of a binding screw $a^2$. The slot in the bar $a$ constitutes the way or race for a slide block $b$ to which the file carrier is connected, and said block may derive reciprocating motion from any suitable mechanical device, as an eccentric or a crank on a revoluble shaft $c$ connected to the block by means of a suitable connecting rod $c'$ as shown in dotted lines in Fig. 1, or said block may be reciprocated by hand through the medium of a suitable handle $c^2$, as shown in full lines in Figs. 1, 3 and 5, said handle being extended downwardly to form a support for one of the elements of the file carrier, which consists of two arms $g$ and $h$, the arm $g$ being pivotally connected to the handle extension or to a bar secured to the slide block $b$, when the latter is mechanically reciprocated, while the arm $h$ is pivotally connected with the block $b$. The free ends of both arms extend through a guide yoke $j$ secured to the race bar $a$, and through said free ends outside of said guide yoke passes loosely a headed bolt $i$, carrying a suitable nut that limits the movement of the arms from each other under the stress of a spring $f$ one end of which is secured to arm $g$ and the other has bearing on the under side of the arm $h$.

Upon the side of the race bar or frame $a$ is secured a ledge or switch plate $m$, hereinafter referred to as the switch, that serves to switch the file carrier onto and off its track hereinafter to be described, said switch $m$ having its ends $m'$ $m^2$ inclined in opposite directions, the arm $h$ being provided with a lug or lateral projection $n$ whose upper and under faces are curvilinear, the lug having an ellipsoidal form in longitudinal section so that when the file carrier is moved from left to right the upwardly curved face of the right end of the lug will engage the downwardly inclined face $m'$ of the switch $m$, and is thereby depressed, causing the file carrier to move onto its track with the file between two teeth of the saw, until said lug has moved from under the switch $m$, at the completion of its operative or positive stroke, when the arm $h$ will be lifted by the spring $f$ to bring the downwardly curved under face at the right of the lug $n$ into the plane of the upwardly curved face $m^2$ of the switch, whereby on the return or negative stroke of the file carrier it will be lifted off its track with the file clear of the saw teeth. As the carrier is about to reach the limit of its negative stroke the lug $n$ again moves off the switch $m$, and allows the carrier to drop back onto its track. This track is preferably constructed of a strip of flat spring steel $w$ so as to make it more or less elastic, its ends being secured between suitable nuts on bolts $x\,y$, screwed to the race bar $a$, said track $w$ being adjustable vertically on its supporting bolts so that a proper inclination may be given to it when a tapering file $k$ is used, in order to render the entire operative length of the file available during its operative or positive stroke, the arm $g$ of the file carrier being provided with a laterally projecting foot piece or pin $v$ that supports the carrier on the track $w$, and with a depending lug at its left end provided with a suitable aperture for the tang of the file $k$ and at its right hand end with a threaded bearing for a clamping bolt $l$, socketed at its end for the reception of the point of said file.

Upon the bed plate and in a plane at right angles to the stroke of the file $k$ is arranged a clamp, or more properly a holder $z$, for the saw Z in which the latter has endwise motion, and said saw derives a step by step motion from the following mechanism, to wit: A lever $r$ is pivoted at $q$ in a standard on the race bar $b$, the lower end of which lever is curved forwardly and to its free end is pivoted a curved arm $t$ that has pivoted thereto a pawl $u$ adapted to engage the saw teeth. A leaf spring $s$ acting on lever $r$ holds the same in a normal position with the pawl $u$ in engagement with a saw tooth. On the rear face and at or near the right hand end of the slide block $b$ is secured an inclined or wedge shaped actuating block $o$ adjustable toward and from the lever $r$ by means of a set bolt $p$ so that as the block approaches the limit of its motion from right to left, said block will force the lever $r$ outwardly in a direction at right angles to the motion of the file $k$, thereby moving the saw, through the medium of the pawl $u$ a distance of one tooth when said block $o$ is properly adjusted. As the block $b$ continues its motion toward the right, the lever $r$ is released from the actuating block or wedge and returns into its normal position the pawl $u$ trailing over one tooth and engaging the next one. When saws with undercut teeth are to be sharpened, I provide a second wedge block $o'$, Fig. 5, in line with the wedge $o$, the inclined face of said block $o'$ being such as to act upon the feed lever $r$ to cause the latter to feed the saw a sufficient distance just before the file carrier reaches the limit of its positive throw to enable the file to clear the tooth just operated upon, as soon as the lug $n$ has moved clear of the switch $m$ the feeding devices returning into their normal position as soon as the file carrier commences its backward motion or negative throw, or before the feed lever $r$ is actuated by the wedge $o$ as above described.

The construction of the file carrier and the saw feeding devices may be modified without departing from the nature of my invention, and in Figs. 6 to 9 I have illustrated one such modification. In this construction the arm $h$ of the file carrier is dispensed with, the pin or bolt $i$ being secured to arm $g$ so as to project vertically from its free end, and on said pin is loosely mounted a sleeve $h^\times$ the under side of which is engaged by the free end of the spring $f$. The upward motion of the sleeve is limited by a suitable nut and jam-nut $i^\times$, and on said sleeve is formed or secured the laterally projecting lug $n$ that is acted upon by the switch to switch the carrier onto and off its track $w$, the yoke or guide $j$ being also dispensed with.

The saw feeding mechanism may be modified as follows: A radial arm $r^4$ on a rock shaft $r^2$ journaled in suitable bearings on the bed plate A carries at its free end a pawl $u^\times$ adapted to engage the saw teeth. The pawl $u^\times$ is guided by a guide $u^0$ that is secured to the jaw $z^0$ of the saw clamp or holder $z$, and is normally held out of engagement with the saw teeth by a spring $r^\times$ at which time said pawl is supported by the guide $u^0$. The guide $u^0$ is adjustable within certain limits on the said jaw $z^0$ by means of a set screw extending through a slot in the guide into said jaw $z^0$, Fig. 8, and although the angle of oscillation of the radial arm is an invariable one, yet the throw of the pawl is such as to feed the saw a distance of one tooth only whatever may be the space between two teeth of the saw, because when the guide $u^0$ is properly adjusted the action of the pawl $u^\times$ on the teeth irrespective of its throw will be limited in accordance with the width of the space between two teeth, so that in case the throw of the pawl is greater than necessary to move the saw a given distance, said pawl will be moved out of engagement with the teeth by the guide $u^0$ as soon as the saw has been moved the required distance. The upper end of the radial arm $r^4$ is slotted, and in said slot is pivoted the pawl $u^\times$ so that the throw of the latter can be adjusted within the limit of the slot. In this manner the feed of the saw will correspond with the space or clearing between the teeth, and as said space or clearing often varies the guide $u^0$ and pawl $u^\times$ should be so adjusted that the latter will engage the clearing or space in which the file $k$ next operates, so that it becomes necessary to move said pawl out of said space or clearing immediately after its feed motion, which is effected by the spring $r^\times$. The rock shaft $r^2$ derives its motion from a revoluble cam faced crank disk $c$ and a roller $o^2$ pivoted on a rock lever $o^3$ that is connected by a link $o^\times$ with a radial arm $o^4$ on said rock shaft $r^2$, said link being adjustable along a slot in said radial arm $o^4$, Fig. 9. It will be seen that the spring $r^\times$ has a tendency to maintain the roller $o^2$ in perpetual contact with the cam face of crank disk $c$, the feeding of the saw being effected by motion of the pawl and its radial arm $r^4$ against the stress of said spring $r^\times$, and as soon as the cam projection on disk $c$ ceases to act upon the roller $o^2$ the pawl is withdrawn from the saw and supported on the guide $w^0$, and this takes place immediately before the file $k$ commences its positive stroke.

The wedge $o'$ described in reference to Figs. 1 to 6, and shown in Fig. 5, for feeding the saw forward sufficiently to enable the file to clear its teeth when said saw has undercut teeth, may be dispensed with by providing a portion of the front face of the track $a$ with an inclined face and correspondingly arranging the pivot $g^\times$, so that its washer $g^0$ when moving over said inclined face will cause the file carrier $g$ to move laterally a distance sufficient to move the file clear of the undercut saw tooth, the arrangement being such that the lateral movement of the carrier will take place immediately before its vertical movement off the track $w$, and in the construction described and shown in reference to Figs. 6 to 9 the said track may be dispensed with. It will be observed that in either construction the file is held to its work by an elastic pressure, whether the track $w$ is used or not, and that the mechanism generally is of the simplest nature.

From the above description the operation of my improved saw-sharpening machine will be readily understood, and needs therefore no further description.

Having thus described my invention, what I claim as new therein, and desire to secure by Letters Patent, is—

1. In a saw sharpening machine, the combination with a saw clamp or holder, a fixed race arranged at right angles to the holder above the same, and a switch connected with said race, of a slide block reciprocally movable along the race, and a file carrier one end of which is articulated to the block and provided at its free end with a lug adapted to be engaged by the switch to lower the carrier toward the saw holder when said carrier is moving in one direction and lift the same from the holder when the carrier moves in a reverse direction, for the purpose set forth.

2. In a saw sharpening machine, the combination with a saw clamp or holder, a fixed race arranged at right angles to the holder above the same, and a switch connected with said race, of a slide block reciprocally movable along the race, and a file carrier articulated to the block and provided with a spring supported lug adapted to be engaged by the switch to lower the carrier toward the saw holder when said carrier is moving in one direction and lift the same from the holder when the carrier moves in a reverse direction, for the purpose set forth.

3. In a saw sharpening machine, the combination with a saw clamp or holder, a fixed race, a fixed supporting and guide track, both arranged at right angles to the saw clamp above the same, a slide block reciprocally movable along the race, and a file carrier articulated to the block and supported and guided by the track when moving in one direction, of switching devices adapted to switch the carrier onto said track when moving in one direction and switch the same off the track when moving in a reverse direction, for the purpose set forth.

4. In a saw sharpening machine, the combination with a saw clamp, a fixed race, a fixed supporting and guide track, both arranged at right angles to the clamp above the same, a slide block reciprocally movable along the race, and a file carrier articulated to the block and supported and guided by the track when moving in one direction, of spring controlled switching devices adapted to switch the carrier onto its track when moving in one direction, and off its track when moving in a reverse direction, for the purpose set forth.

5. In a saw sharpening machine, the combination with a saw clamp, a fixed race, and a more or less elastic supporting and guide track, both arranged at right angles to the clamp, a slide block having reciprocal motion along the race, and a file carrier articulated to the block and having motion in one direction on the track, of switching devices adapted to switch the carrier onto its track when moved in one direction and off said track when moved in a reverse direction, for the purpose set forth.

6. In a saw sharpening machine, the combination with a saw clamp, a fixed race, and a more or less elastic supporting and guide track, both arranged at right angles to the clamp above the same, a slide block having reciprocal motion along the race, and a file carrier articulated to the block and having motion in one direction on the track, of spring controlled switching devices adapted to switch the carrier onto its track when moved in one direction, and off said track when moved in a reverse direction, for the purpose set forth.

7. In a saw sharpening machine, the combination with a saw clamp, a fixed race, and a more or less elastic supporting and guide track, both arranged at right angles to the clamp above the same, said track vertically adjustable, a slide block having reciprocal motion along the race, and a file carrier articulated to the block and having motion in one direction on the track; of switching devices adapted to switch the carrier onto its track when moved in one direction and off said track when moved in a reverse direction, for the purpose set forth.

8. In a saw sharpening machine, the combination with a fixed saw clamp, a fixed race, and a more or less elastic supporting and guide track, both arranged at right angles to the clamp above the same, means for vertically adjusting either end of said track, a slide block having reciprocal motion along the race, and a file carrier articulated to the block and having motion in one direction on the track, of switching devices adapted to switch the carrier onto its track when moved in one direction, and off said track when moved in a reverse direction, for the purpose set forth.

9. In a saw sharpening machine, the combination with a saw clamp or holder, a fixed race arranged at right angles to the holder above the same, a slide block reciprocally movable along the race, a file carrier and file, said carrier articulated to the slide block, and switching devices adapted to lower and lift the file carrier toward and from the saw clamp; of means substantially such as described and operating to clear the file from an undercut portion of a saw tooth before the carrier is lifted by the switching devices to move the file from between the saw teeth.

10. In a saw sharpening machine, the combination with a saw clamp and a file carrier reciprocally movable across the clamp, of a saw feeding device comprising a spring-controlled pawl lever, and an inclined face near one end of the file carrier adapted to engage and move the lever against the stress of its spring, substantially as and for the purpose set forth.

11. In a saw sharpening machine, the combination with a saw clamp and a file carrier reciprocally movable across the clamp, of a saw feeding device comprising a spring controlled pawl lever and a longitudinally adjustable inclined face near one end of the file carrier adapted to engage and move the lever against the stress of its spring, substantially as and for the purpose set forth.

12. In a saw sharpening machine, the combination with a saw clamp, and a file carrier reciprocally movable across the clamp, of a saw feeding device comprising a spring controlled pawl lever, a fixed inclined plane near one end of the carrier, and an inclined plane adjustable longitudinally of the carrier near its opposite end, said planes adapted to alternately engage and move the pawl lever against the stress of its spring during the reciprocations of the file carrier, for the purpose set forth.

13. In a saw sharpening machine, the combination with the saw clamp, a fixed race provided with a vertical standard, and a file carrier reciprocally movable along the race and provided near one end with a longitudinally adjustable wedge; of a spring-controlled lever pivoted in said standard, having its free end curved about the saw clamp, a curved arm pivotally connected with the free end of the lever, and a pawl normally in contact with the upper face of the aforesaid saw clamp, said pawl pivotally connected with the free end of the curved arm, substantially as and for the purpose set forth.

In testimony that I claim the foregoing as my invention I have signed my name, in presence of two witnesses, this 21st day of May, 1892.

F. RICHARD BAUER.

Witnesses:
 ALEXANDER SPECHT,
 DIEDRICH PETERSEN.